US008003566B2

(12) United States Patent
Casci et al.

(10) Patent No.: US 8,003,566 B2
(45) Date of Patent: Aug. 23, 2011

(54) PROCESS FOR PREPARING CATALYST SUPPORTS HAVING REDUCED LEVELS OF CONTAMINANTS

(75) Inventors: John Leonello Casci, Redcar (GB); Elizabeth Margaret Holt, Stockton on Tees (GB); Adel Fay Neale, Redcar (GB)

(73) Assignee: Johnson Matthey PLC, London (GB)

( * ) Notice: Subject to any disclaimer, the term of this patent is extended or adjusted under 35 U.S.C. 154(b) by 99 days.

(21) Appl. No.: 11/887,947

(22) PCT Filed: Mar. 21, 2006

(86) PCT No.: PCT/GB2006/050061
§ 371 (c)(1), (2), (4) Date: Oct. 5, 2007

(87) PCT Pub. No.: WO2006/106357
PCT Pub. Date: Oct. 12, 2006

(65) Prior Publication Data
US 2009/0054224 A1    Feb. 26, 2009

(30) Foreign Application Priority Data
Apr. 6, 2005 (GB) .................................. 0506976.0

(51) Int. Cl.
*B01J 23/58* (2006.01)
(52) U.S. Cl. .......... 502/328; 502/64; 502/332; 502/336; 502/330; 502/324; 423/625
(58) Field of Classification Search .................. None
See application file for complete search history.

(56) References Cited

U.S. PATENT DOCUMENTS

| | | | | |
|---|---|---|---|---|
| 3,856,706 A * | 12/1974 | Harrison et al. | ............. | 502/439 |
| 4,302,359 A * | 11/1981 | Mauldin et al. | ............. | 502/331 |
| 4,338,089 A * | 7/1982 | Schaper et al. | ............. | 518/707 |
| 4,422,960 A * | 12/1983 | Shiroto et al. | ............. | 502/206 |
| 4,613,585 A * | 9/1986 | Takumi et al. | ............. | 502/355 |
| 5,596,816 A * | 1/1997 | Mills et al. | ...................... | 34/346 |
| 5,733,839 A * | 3/1998 | Espinoza et al. | ............. | 502/336 |
| 5,874,381 A * | 2/1999 | Bonne et al. | .................. | 502/327 |
| 6,534,436 B2 | 3/2003 | Lok et al. | | |
| 6,676,829 B1 * | 1/2004 | Angevine et al. | ............. | 208/210 |
| 6,927,190 B2 | 8/2005 | Lok et al. | | |
| 2002/0123633 A1 * | 9/2002 | McAteer et al. | ............. | 546/352 |
| 2004/0092003 A1 * | 5/2004 | Boschetti et al. | .......... | 435/287.1 |
| 2004/0132832 A1 * | 7/2004 | Espinoza et al. | ............. | 518/716 |
| 2004/0186188 A1 * | 9/2004 | Van Berge et al. | ............. | 518/716 |
| 2004/0194664 A1 * | 10/2004 | McAulay et al. | ............. | 106/456 |
| 2005/0272827 A1 | 12/2005 | Lok | | |

FOREIGN PATENT DOCUMENTS

| | | |
|---|---|---|
| EP | 0 500 176 | 8/1992 |
| WO | 03/018481 | 3/2003 |
| WO | 2004/043583 A2 | 5/2004 |
| WO | 2004/089540 A1 | 10/2004 |

OTHER PUBLICATIONS

Wei et al., "The effect of pretreatment on the attrition resistance of spray-dried alumina", *Applied Catalysts* A:201 (2000), pp. 129-138.
Zhang et al., "Chemical treatment of $\gamma$-$Al_2O_3$ and its influence on the properties of Co-based catalysts for Fischer-Tropsch synthesis", *Applied Catalysts*, A-243 (2003) pp. 121-133.
International Search Report for PCT/GB2006/050061 dated Jun. 21, 2006.

* cited by examiner

*Primary Examiner* — Melvin Curtis Mayes
*Assistant Examiner* — Smita Patel
(74) *Attorney, Agent, or Firm* — Jones Day

(57) ABSTRACT

A method of preparing a catalyst support is described comprising washing a precipitated metal oxide material with water and/or an aqueous solution of acid and/or base such that contaminant levels in said precipitated metal oxide are reduced. The method may be applied to precipitated alumina materials to reduce contaminants selected from sulphur, chlorine, Group 1 A and Group 2A metals. The catalyst supports may be used to prepare catalysts for the Fischer-Tropsch synthesis of hydrocarbons.

13 Claims, No Drawings

PROCESS FOR PREPARING CATALYST SUPPORTS HAVING REDUCED LEVELS OF CONTAMINANTS

CROSS-REFERENCE TO RELATED APPLICATION

This application is the National Phase application of International Application No. PCT/GB2006/050061, filed 21 Mar. 2006, which designates the United States and was published in English. This application, in its entirety, is incorporated herein by reference.

This invention relates to a method for the preparation of catalyst supports and in particular precipitated metal oxide supports containing reduced levels of contaminants.

Precipitated oxide materials such as aluminas, silicas, titanias and zirconias are used as catalyst supports in a wide range of industrial processes.

Precipitated metal oxides may be prepared by adding a base, often a Group 1A or Group 2A metal hydroxide, to a metal salt solution such as an aluminium, titanium or zirconium sulphate, chloride or nitrate solution. Alternatively, aluminas may be made by acidification of sodium aluminate. Precipitated silicas are typically prepared by adding an acid, e.g. sulphuric or hydrochloric acid, to sodium or potassium silicate solutions. The oxidic materials are subsequently separated, washed with water, dried and calcined. However, contaminants such as sulphur (e.g. from sulphate/sulphuric acid), chlorine (e.g. from chloride salts), and Group 1A and 2A metals (e.g. from the base) may be present in undesirably high amounts.

In industrial catalytic processes, there can be an undesirable interaction between contaminants in the support and catalyst so that it may be necessary to carefully select the support to avoid side reactions and provide satisfactory activity. Accordingly for some processes it may be necessary to avoid precipitated catalyst supports altogether. For example in the Fischer-Tropsch synthesis of hydrocarbons, high purity supports for cobalt catalysts are commonly used in order to achieve satisfactory catalyst activity and selectivity to C5+ hydrocarbons. In particular, so-called 'Ziegler' alumina materials have been found effective. Ziegler aluminas are prepared by the hydrolysis of aluminium alkoxides and therefore are more expensive to manufacture on an industrial scale compared to precipitated aluminas. Furthermore, precipitated supports may offer desirable physical properties such as high surface area, high pore volume and high attrition resistance.

We have found surprisingly that conventional precipitated oxidic supports may be washed with water and/or acid and/or base solutions to advantageously reduce contaminants such as sulphur, chlorine and/or Group 1A and Group 2A metals to provide purified supports that may be used to prepare catalysts with acceptable properties.

Accordingly the invention provides a method of preparing a catalyst support comprising washing a precipitated metal oxide material with water and/or an aqueous solution of acid and/or base such that contaminant levels in said precipitated metal oxide are reduced.

By "washing" we mean contacting a preferably dried and optionally calcined precipitated metal oxide with water or an aqueous solution under conditions sufficient to extract contaminants from the oxide. Typically the extraction of the contaminants will be followed by a separation stage whereby the water or aqueous solution containing the contaminants is separated from the oxide.

Contaminants in precipitated metal oxides particularly include sulphur, chlorine, Group 1A and Group 2A metals and transition metals. In precipitated materials sulphur is typically present as sulphate anion ($SO_4^{2-}$) and chlorine is typically present as the chloride anion ($Cl^-$). The Group 1A and 2A metals include $Na^+$, $K^+$, $Mg^{2+}$ and $Ca^{2+}$ cations. The present invention provides precipitated oxidic catalyst supports in which contaminants, particularly sulphur and Group 1A and Group 2A metals, may be reduced by >10%, preferably >25%, more preferably >50% compared to the unwashed material. For example, in commercial precipitated aluminas, such as a delta alumina prepared from aluminium sulphate solution, the sulphur content may be >450 ppm and the Group 1A or 2A metals typically >100 ppm. The washed alumina material according to the present invention has been found to contain sulphur below 150 ppm and Group 1A and 2A metals below 80 ppm.

The levels of other contaminants may also be reduced by the present invention. For example acid and/or base washing has been found to reduce the levels of iron (Fe), silicon (Si), titanium (Ti), zinc (Zn) and zirconium (Zr) in alumina materials.

The oxidic material may be any precipitated oxidic catalyst support including mixed metal oxides. Preferably the oxidic support is selected from alumina, titania and zirconia supports. Silicas are also included in the present invention. The alumina, titania and zirconia oxidic supports may be in partially hydrated or fully hydrated form. Preferably the oxidic supports have been subjected to a drying and/or calcination step. By "drying" we mean that the oxidic support has been heated to substantially remove liquids, such as water or acetone. Drying temperatures are typically ≦150° C. By "calcination step" we mean the oxide or its precursor have been heated at elevated temperature to effect a physiochemical change. Calcination temperatures may be, depending upon the oxide and the extent of change required, typically in the range 250-800° C. The support may comprise one or more of alumina, silica, titania and zirconia, for example the support may be an aluminosilicate, a titania-coated silica or alumina, or a zirconia-coated silica or alumina. Preferably the oxidic support is an alumina, more preferably, the support is a transition alumina, such as a gamma, delta or theta alumina or alpha alumina. Gamma and delta aluminas and mixtures thereof are especially preferred.

We have found that water washing of dried and/or calcined precipitated oxidic materials is able to lower the level of Group 1A contaminants such as Na or K to acceptable levels. In particular we have found that water washing of transition aluminas, especially gamma or delta aluminas, reduces the Na levels. It will be understood that the water should itself not contain substantial amounts of contaminants and preferably the water is demineralised and/or de-ionised water. However, we have found that water washing does not significantly reduce the level of other contaminants that may be present in the precipitated oxidic materials. We have found that acid and/or base washing of the oxidic materials is able to reduce the levels of a broader range of contaminants.

Treatment of gamma-alumina Fischer-Tropsch catalyst supports with acids or bases to alter their chemical properties is known. In *Applied Catalysis A:* 201 (2000) 129-138, a gamma alumina was treated with acid or base solutions by incipient wetness. It was found that increasing the pH was detrimental to catalyst attrition. In *Applied Catalysis A* 243 (2003) 121-133 a gamma alumina was treated at 270° C. in an autoclave with solutions of acetic acid, ammonia or ammonium nitrate and dried. The acetic acid treatment was found to be detrimental to the reducibility and hence activity of the catalyst. In neither case was the alumina washed to reduce the amount of contaminants.

The acids may be any suitable aqueous acid including hydrochloric, nitric or sulphuric acids. Organic acids such as formic acid or acetic acid may be used. Nitric acid or hydrochloric acids are preferred. Nitric acid is most preferred, because upon calcination of the support, no residues of the acid should remain. The concentration of acid is preferably such that contaminants may be effectively removed without substantial dissolution of the metal oxide support. Preferably the concentration of acid is $\leq 10$ molar, more preferably $\leq 6$ molar. Similarly the base may be any suitable aqueous base including aqueous ammonia, sodium hydroxide and potassium hydroxide. Organic bases may also be used. Aqueous ammonia is preferred as it removes contaminants without increasing the Group 1A or Group 2A metal contamination and is readily removed during subsequent drying and any calcination step. The concentration of base is preferably such that contaminants may be effectively removed without substantial dissolution of the metal oxide support. Preferably the concentration of base is $\leq 10$ molar, more preferably $\leq 6$ molar. Preferably demineralised and/or deionised water is used to prepare the acid and base solutions.

The oxidic supports may be washed at ambient or elevated temperatures appropriate to the acid or base solution concerned. Preferably the supports are washed at ambient temperatures (e.g. 10 to 30° C.) although temperatures up to 90° C. are suitable. If desired, washing may be performed in an autoclave at elevated pressures that allow the washing temperature to be increased e.g. to 150° C. The washing time may be varied from seconds to hours according to the contaminant level, the acid or base concentration and the washing temperature to ensure satisfactory contaminant removal without substantial dissolution of the oxidic support. For example ambient temperature washing of an alumina support with acid or base may be in the range 1 minute to 24 hours, preferably $\leq 12$ hours, more preferably $\leq 4$ hours.

Washing may be carried out batch-wise or continuously, depending on the availability of process equipment and/or scale of operation.

We have found that water washing is particularly effective for removing Na ions, acid washing is particularly effective for removing Group 1A and 2A metal contaminants, whereas base washing is particularly effective for removing sulphur contaminants. Hence in one embodiment of the present invention, the oxidic support is washed with just water. In another embodiment of the present invention, the oxidic support is washed with just an acid solution. In another embodiment the oxidic support is washed with a base solution. In a preferred embodiment, the oxidic support is washed with an acid solution and a base solution. In this embodiment, the acid wash may precede or be subsequent to the base wash.

If desired, more than one acid and/or base wash may be performed using the same or different acids and/or bases.

Intermediate water washing steps may also be performed between any acid and/or base washing steps.

By the term acid wash we mean that the aqueous solution used to wash the support has a pH <7, preferably $\leq 5$. By the term base wash we mean that the aqueous solution used to wash the support has a pH >7, preferably $\geq 9$.

The support may be washed with water prior to and/or subsequent to washing with aqueous acid and or base solution. Preferably, the supports are washed with water subsequent to acid and/or base washing. Such water washing substantially removes traces of the acid or base from the support in direct contrast to the treatment methods in the aforesaid Applied Catalysis papers. However, we have found that water washing alone is not effective in reducing all contaminants. Without wishing to be bound by theory it is possible that the acid and base washing steps result in some ion-exchange in the matrix of the support that allows enhanced displacement of the contaminants from the support, especially if followed by water washing.

The washed oxidic supports are preferably dried before use. Drying may be performed using any suitable method such as oven drying, fluid-bed drying, rotary drying, spray drying and so-called flash drying. If desired, the oxides may be dried between washing steps. Drying is preferably carried out by heating the washed supports to between 20 and 150° C., more preferably between 60 and 120° C. for up to 24 hours. If desired, the washed supports may also be subjected to calcination at temperatures >200° C., preferably >400° C. for up to 24 hours to alter the physiochemical properties of the support.

Drying and/or calcining may be carried out batch-wise or continuously, depending on the availability of process equipment and/or scale of operation.

Surprisingly, we have found that the washing process of the present invention while reducing contaminants may not substantially alter desirable physical characteristics of the catalyst support such as BET surface area, pore volume and pore diameter.

The washed catalyst supports prepared according to the present invention may be used to prepare a wide range of catalysts.

Thus the invention further provides a process for the preparation of a catalyst comprising the steps of (i) washing a precipitated metal oxide material with water and/or an aqueous solution of acid and/or base such that contaminant levels in said precipitated metal oxide are reduced, (ii) drying and optionally calcining the washed support, and (iii) contacting the support with a catalyst compound.

The catalysts may be prepared according to methods known in those skilled in the art, for example by impregnation or precipitation techniques from solution whereby a catalytically active metal compound e.g. a compound of Co, Cu, Ni, Fe, Cr, Mo, Ti, Mn, Zn, Pt, Pd, Ru or Re is deposited on or within the support. The catalyst may then be further processed to produce the finished catalyst material. For example the impregnated or precipitated mixture may be dried and/or calcined and if desired formed into shaped units by extrusion, tabletting or granulation. Alternatively the washed supports may be used within a washcoat applied to a ceramic or metal monolith or foam. Alternatively, the support may be mixed with a solid catalyst material such as a zeolite and the resulting mixture formed into shaped catalyst units by extrusion, granulation or tabletting. The washed supports may also be used to 'heterogenize' homogeneous catalysts, for example in organic synthesis such as asymmetric hydrogenation reactions.

The catalysts prepared by the process may find use in a wide range of industrial applications such as hydrocarbon purification, hydrodesulphurisation, reforming, water-gas shift reactions, methanol and ammonia synthesis, hydrogenation of oils and fats, polymerization of olefins and the Fischer-Tropsch synthesis of hydrocarbons. Furthermore the catalysts may find use in selective oxidation reactions such as ethylene oxide manufacture and in automotive exhaust catalysts. In a preferred use, the catalysts are cobalt-containing catalysts, including promoted cobalt catalysts, for the Fischer-Tropsch synthesis of hydrocarbons. In particular, the supports may be used to prepare cobalt catalysts by deposition-precipitation techniques using solutions of cobalt amine carbonate such as described in U.S. Pat. No. 5,874,381, U.S. Pat. No. 6,534,436, U.S. Pat. No. 6,927,190 and US 2005-0272827.

The invention is further illustrated by the following examples.

BET surface areas and pore volumes were measured using well-known nitrogen physisorption techniques and alumina phases were determined using X-ray diffraction. The contaminant levels are quoted in parts per million weight (ppm) and were measured using inductively-coupled plasma-atomic emission spectroscopy or mass spectroscopy. Chlorine analysis was carried out by microcoulimetry. Attrition resistances on base-washed aluminas were determined by an air-jet method and are quoted as attrition loss % (see ASTM D5757).

EXAMPLE 1

Acid Washing

Nitric acid ($HNO_3$) solutions were made up in 1000 ml volumetric flasks; the molarities of solutions were 0.5M, 2M, 4M and 6M. 200 g of a commercially available sulphate-derived Puralox KR160 precipitated alumina was weighed into a 2-liter glass beaker and the acid solution was added and stirred for 1 hour on the magnetic stirrer at room temperature. The slurry was then filtered and washed with demineralised water in a Buchner funnel. Hot demineralised water was used for the 2M, 4M and 6M solutions. We have found that subsequent washing with hot water (water temperature >30° C.) improves the filterability of acid-washed alumina supports. This washing was repeated until the conductivity of the filtrate was in the region of 300 μS/cm. The filtered samples were placed on glass trays (31 cm×24.5 cm), spread thinly and then placed in metal trays and covered with meshes. The samples were dried over night (ca 16 hours) in a fan oven at 110° C. then the temperature was ramped at 2° C. per minute to 450° C. where it was held for 16 hours to calcine the samples. The results for the different washed aluminas and the unwashed parent alumina are as follows;

Acid washing the alumina removes the calcium and sodium from the alumina as well as some iron, silicon, titanium, lanthanum and magnesium. The acid treatment of the alumina did not significantly alter the BET surface area, pore volume or average pore diameter (APD) of the alumina. The alumina phases were confirmed by X-ray diffraction to be delta in each case.

EXAMPLE 2

Base Washing 300 g of Puralox KR160 alumina were weighed out into a 2-liter conical flask. Then a pre-determined amount of ammonium hydroxide was weighed out into a 1 liter volumetric flask and made up to the liter. 2M and 6M solutions were prepared. The conical flask containing the alumina was placed on the stirring mantle at room temperature and the 1-liter solution added. This was taken as time zero. After 30 minutes a sample of the slurry was taken using a 10 ml syringe 3 times. This was filtered through the small Buchner funnel. The filtrate was kept and the filter cake was washed with 400 ml of demineralised water. Samples were also taken at 1, 2, 4, 8 and 24 hours. After 24 hours the remaining slurry was filtered through a large Buchner funnel. The recovered filter cake was washed with 3 liters of demineralised water. All the samples were then placed in a fan oven and heated from room temperature at 2° C. per minute to 110° C. and held for 16 hours to dry the samples. The temperature was then increased at 2° C. a minute to 550° C. and held for a further 16 hours to calcine the samples.

A sample of the alumina was also washed with 0.5M or 2M ammonium hydroxide for 1 hour at room temperature, dried and calcined at 450° C. The results for the different washed aluminas and the unwashed parent alumina are as follows;

TABLE 1a

Contaminant levels (ppm)

| Wash | S | Fe | Ca | Na | Si | Ti | Zn | Ga | La | Mg | Zr |
|---|---|---|---|---|---|---|---|---|---|---|---|
| None | 480 | 150 | 490 | 150 | 180 | 36 | 17 | 69 | 52 | 109 | 4 |
| 0.5M | 512 | 151 | 19 | 23 | 42 | 26 | 12 | — | — | 76 | <10 |
| 2M | 466 | 116 | 76 | <50 | 120 | 9 | 4 | 62 | 24 | 66 | 1 |
| 4M | 465 | 118 | 68 | <50 | 118 | 10 | 3 | 60 | 23 | 70 | 1 |
| 6M | 465 | 115 | 70 | <50 | 124 | 10 | 4 | 62 | 21 | 78 | 1 |

TABLE 1b

Physical properties

| Wash | BET SA ($m^2g^{-1}$) | Pore vol ($cm^3g^{-1}$) | APD (Angstrom) |
|---|---|---|---|
| none | 161.7 | 0.79 | 202 |
| 0.5M | 163.7 | 0.80 | 203 |
| 2M | 169.6 | 0.87 | 208 |
| 4M | 171.9 | 0.87 | 204 |
| 6M | 165.1 | 0.86 | 211 |

TABLE 2a

| Wash | Contaminant levels (ppm) | | | | | | | | | | |
|---|---|---|---|---|---|---|---|---|---|---|---|
| | S | Fe | Ca | Na | Si | Ti | Zn | Ga | La | Mg | Zr |
| none | 480 | 150 | 490 | 150 | 180 | 36 | 17 | 69 | 52 | 109 | 4 |
| 0.5M (1 hr) | 141 | 144 | 448 | 116 | 32 | 25 | 10 | — | — | 137 | <10 |
| 2M (1 hr) | 111 | 120 | 437 | 86 | 109 | 22 | 10 | — | — | — | 7 |
| 2M (24 hrs) | 144 | 144 | 457 | 56 | 92 | 27 | 6 | 64 | 46 | 101 | <1 |
| 6M (24 hrs) | 147 | 142 | 465 | 61 | 92 | 27 | 10 | 63 | 45 | 100 | <1 |

TABLE 2b

| Wash | Physical Properties | | | |
|---|---|---|---|---|
| | BET SA ($m^2g^{-1}$) | Pore volume ($cm^3g^{-1}$) | APD (Angstrom) | Attrition Loss % |
| none | 161.7 | 0.79 | 202 | 38 |
| 0.5M (1 hr) | 175.9 | 0.78 | 184 | — |
| 2M (1 hr) | 181.0 | 0.82 | 184 | — |
| 2M (24 hrs) | 171.4 | 0.78 | 182 | 34 |
| 6M (24 hrs) | 172.7 | 0.77 | 181 | — |

Base washing removes sulphur and sodium as well as some silicon and titanium. The base washing did not significantly alter the BET surface area, pore volume or average pore diameter (APD) of the alumina. Attrition resistance has not been reduced. The alumina phases were confirmed by X-ray diffraction to be delta in each case.

Thus washing a precipitated alumina with acid, base and water can remove specific impurities. Washing with an acid removes the calcium and sodium as well as some silica, titanium, lanthanum and magnesium. Washing with base removes the sulphur and sodium as well as some silica and titanium. The attrition resistance appears not to have been deteriorated by base washing. This is particularly desirable in fluidised bed or slurry phase catalysts, e.g. Fischer-Tropsch catalysts for use in slurry bubble column reactors. These results are surprising as they contradict the teaching of *Applied Catalysis A*: 201 (2000) 129-138, where it was found that increasing the pH of a gamma alumina surface by incipient wetness treatment was detrimental to catalyst attrition.

EXAMPLE 3

Sequential Acid and Base Washing

Samples of Puralox KR160 were subjected to acid washing or base washing according to the methods of Examples 1 and 2 using 2M solutions of acid ($HNO_3$, 1 hr) or base ($NH_4OH$, 24 hrs), but without the calcination step. In each case, the dried material was rewashed with 2M solutions of base or acid, again according to the method of Examples 1 and 2. The acid-base (A+B) or base-acid (B+A) washed materials were then dried at 120° C. and calcined at 450° C. The results are as follows;

TABLE 3a

| Wash | Contaminant levels (ppm) | | | | | | | | |
|---|---|---|---|---|---|---|---|---|---|
| | S | Fe | Ca | Na | Si | Ti | Zn | Mg | Zr |
| none | 480 | 150 | 490 | 150 | 180 | 36 | 17 | 109 | 4 |
| B + A | 113 | 138 | 20 | 43 | 71 | 20 | <10 | 49 | 17 |
| A + B | 133 | 113 | 20 | <10 | 85 | 10 | <10 | 73 | <10 |

TABLE 3b

| Wash | Physical Properties | | |
|---|---|---|---|
| | BET SA ($m^2g^{-1}$) | Pore volume ($cm^3g^{-1}$) | APD (Angstrom) |
| none | 161.7 | 0.79 | 202 |
| B + A | 188.5 | 0.87 | 186 |
| A + B | 175.9 | 0.86 | 197 |

These results show that the sequential acid and base washes are effective in removing S and Na, Ca, Mg as well as Si. Furthermore, the sequential washing has not substantially altered the textural and physical properties of the alumina.

EXAMPLE 4

Catalyst Preparation

Cobalt catalysts containing about 40% wt cobalt were prepared using a) The 6M acid-washed calcined alumina from Example 1, b) the 2M ammonium hydroxide washed calcined alumina from Example 2 and c) the 2M ammonium hydroxide/2M nitric acid (B+A) washed calcined alumina from Example 3

A cobalt hexammine carbonate solution was first prepared by dissolving 198 g of ammonium carbonate chips in a solution comprising 1880 ml of demineralised water and 1920 ml 30% aqueous ammonia. Once the chips had dissolved, 218 g of cobalt carbonate was added and left to stir overnight. The solution was then filtered and allowed to age for 2 days prior to use. The alumina was then treated with the aged cobalt hexammine carbonate solution. 43.5 g of the alumina was added to 2 liters of cobalt hexamine carbonate solution and stirred and heated to boiling. The pH of the mixture was monitored. When the pH of the solution had dropped to 7.5 to 7.7 the stirring was stopped and the mixture cooled. The mixture was then filtered using a Buchner funnel and the filter cake washed with 2 liters of demineralised water. The resultant powder was then dried in an oven overnight at 110° C. Once dry, the powder was sieved through a 1 mm sieve.

For comparison, an unwashed Puralox KR160 alumina was used to prepare a 40% wt cobalt catalyst according to the above method.

The BET surface areas, pore volume and average pore diameter for the supported catalysts in the unreduced state were determined. The cobalt surface areas of the catalysts reduced at 425° C. under hydrogen as measured by hydrogen chemisorption at 150° C., according to the method described in the aforesaid U.S. Pat. No. 6,927,190, were also determined. The catalyst characteristics were as follows;

| Catalyst | BET surface area ($m^2g^{-1}$) | Pore volume ($cm^3g^{-1}$) | Average pore diameter (Å) | Co surface area ($m^2g^{-1}$cat) |
|---|---|---|---|---|
| Unwashed support | 152.4 | 0.18 | 50 | 30.6 |
| 4a (Acid washed) | 189.0 | 0.21 | 46 | 34.5 |
| 4b (Base washed) | 181.4 | 0.20 | 46 | 32.7 |
| 4c (Base + Acid washed) | 187.6 | 0.19 | 42 | 32.5 |

EXAMPLE 5

Catalyst Testing

The cobalt catalysts of Example 4 were used for the Fischer-Tropsch synthesis of hydrocarbons in a laboratory-scale reactor. About 0.1 g of unreduced catalyst in a diluted bed (ca. 4 mm ID by 50 mm depth) was first reduced at 430° C. for 420 min or 540 min in a hydrogen flow of 30 ml/minute. Then hydrogen and carbon monoxide at a 2:1 ratio were passed through the bed at 210° C./20 barg. The space velocity was adjusted after 30 hrs to obtain as close as possible 50% CO conversion. The activity and selectivity of the catalyst to $CH_4$, C2-C4 and C5+ hydrocarbons were measured using known Gas Chromatography (GC) techniques.

For comparison, the unwashed Puralox KR160 alumina cobalt catalyst was tested in an identical manner to the catalysts prepared using the washed supports of Examples 1 and 2 (Comp. 1). Also for comparison a high purity alumina (HP14/150 from Sasol) was use to prepare a 40% wt cobalt catalyst according to the method of Example 4 and tested in an identical manner to the catalyst prepared using the washed support of Example 3 (Comp. 2). The results were as follows;

| Example | Weight Catalyst (g) | Reduction Temp (° C.) | Reduction $H_2$ Flow (ml/min) | Reduction Hold time (min) |
|---|---|---|---|---|
| Comp. 1 | 0.100 | 430 | 30 | 420 |
| 4a | 0.100 | 430 | 30 | 420 |
| 4b | 0.102 | 430 | 30 | 420 |
| 4c | 0.100 | 430 | 30 | 540 |
| Comp. 2 | 0.099 | 430 | 30 | 540 |

| Example | Reaction Temp. (° C.) | Reaction Pressure (barg) | Syngas Flowrate (ml/min) | Relative Activity | $CO_2$ (%) | $CH_4$ (%) | C2-C4 (%) | C5+ (%) | C5=/C5 (%) |
|---|---|---|---|---|---|---|---|---|---|
| Comp. 1 | 210 | 20 | 11 | 1.00 | 0.70 | 12.15 | 3.93 | 83.9 | 0.37 |
| 4a | 210 | 20 | 11 | 1.52 | 0.65 | 9.93 | 6.75 | 82.7 | 0.27 |
| 4b | 210 | 20 | 11 | 1.71 | 0.95 | 14.54 | 8.12 | 76.4 | 0.16 |
| 4c | 210 | 20 | 15 | 1.57 | 0.65 | 19.42 | 12.93 | 67.0 | 0.39 |
| Comp. 2 | 210 | 20 | 15 | 1.67 | 1.04 | 9.58 | 6.64 | 82.7 | 0.14 |

The catalysts were active and produced C5+ hydrocarbons. The activity of the reduced catalysts is given relative to the reduced unwashed-support catalyst. The relative activity to the unwashed Puralox KR160 catalyst is a useful measurement for comparing the catalysts prepared using the washed supports of the present invention. It can be seen that all the washed-support catalysts were more active than the unwashed-support catalyst, and that the activity of the base washed-support catalyst matched that of the high purity alumina-support catalyst. Furthermore the C5+ selectivity of the acid-washed-support catalyst was also comparable to that of the high purity alumina-support catalyst. In particular, the effectiveness of the acid-washed catalyst is surprising in view of *Applied Catalysis A* 243 (2003) 121-133 in which acetic acid treatment of a gamma alumina at 270° C. in an autoclave was found to be detrimental to the reducibility and hence activity of the catalyst.

EXAMPLE 6

A chloride-derived precipitated alumina was subjected to base+acid (B+A) washing using 2M $NH_4OH$ and 2M $HNO_3$ according to the method of Example 3, except that the base washing was continued only for 1 hr rather than 24 hrs. The results are as follows;

TABLE 6a

| | Contaminant levels (ppm) | | | | | | | | | |
|---|---|---|---|---|---|---|---|---|---|---|
| Wash | S | Fe | Ca | Na | Si | Ti | Zn | Mg | Zr | Cl |
| none | 104 | 66 | 148 | 165 | 407 | 584 | 110 | 54 | 22 | 526 |
| B + A | 23 | 54 | 58 | 41 | 365 | 520 | 135 | 43 | 63 | 13 |

TABLE 6b

| | Physical Properties | | |
|---|---|---|---|
| Wash | BET SA ($m^2g^{-1}$) | Pore volume ($cm^3g^{-1}$) | APD (Angstrom) |
| none | 175.2 | 0.51 | 117 |
| B + A | 183.4 | 0.54 | 117 |

It can be seen that the base+acid washing has markedly reduced the S, Cl, Ca and Na levels without deteriorating the physical properties of the alumina.

EXAMPLE 7

Continuous Washing 300 g of Puralox KR160 alumina was weighed out then placed into a Bunchner funnel. 1 L of 2M $NH_4OH$ solution was added to the alumina until it was about 1 cm above the alumina level. The vacuum was then turned on. The $NH_4OH$ was continuously poured onto the alumina to maintain a constant 1 cm level above the alumina. After all the solution had been added and filtered through the alumina the filter cake was washed with 3 L of demineralised water. The filter cake was then dried in an oven with a 2° C. ramp to 120° C. and held for 16 hours and then the temperature was ramped 2° C. per minute to 450° C. were it was calcined for 16 hours.

The experiment was repeated using 2M HNO$_3$. The results were as follows;

TABLE 7a

| Wash | Contaminant levels (ppm) | | | | | | | | |
|---|---|---|---|---|---|---|---|---|---|
| | S | Fe | Ca | Na | Si | Ti | Zn | Mg | Zr |
| none | 480 | 150 | 490 | 150 | 180 | 36 | 17 | 109 | 4 |
| 2M Acid | 485 | 130 | 37 | 9 | 47 | 10 | 6 | 68 | <1 |
| 2M Base | 149 | 151 | 354 | 31 | 48 | 21 | 12 | 96 | <1 |

TABLE 7b

| Wash | Physical Properties | | |
|---|---|---|---|
| | BET SA (m$^2$g$^{-1}$) | Pore volume (cm$^3$g$^{-1}$) | APD (Angstrom) |
| none | 161.7 | 0.79 | 202 |
| 2M Acid | 158.0 | 0.80 | 211 |
| 2M Base | 161.0 | 0.78 | 200 |

It can be seen that the continuous acid washing is effective in reducing the Ca, Na, Si and Mg levels; and continuous base washing the S levels without deteriorating the physical properties of the alumina.

EXAMPLE 8

Water Washing

A 200 g sample of Puralox KR160 alumina was subjected to water washing using demineralised water at room temperature for 24 hrs at boiling water for 1 hour. The water-washed alumina was dried and calcined according to the method of example 1. The results were as follows;

TABLE 8a

| Wash | Contaminant levels (ppm) | | | | | | | | |
|---|---|---|---|---|---|---|---|---|---|
| | S | Fe | Ca | Na | Si | Ti | Zn | Mg | Zr |
| none | 480 | 150 | 490 | 150 | 180 | 36 | 17 | 109 | 4 |
| Boiling (1 hr) | 388 | 155 | 414 | 17 | 102 | 26 | 12 | 99 | <10 |
| Room Temp. (24 hrs) | 393 | 155 | 430 | 15 | 100 | 27 | 4 | 110 | <1 |

TABLE 8b

| Wash | Physical Properties | | |
|---|---|---|---|
| | BET SA (m$^2$g$^{-1}$) | Pore volume (cm$^3$g$^{-1}$) | APD (Angstrom) |
| none | 161.7 | 0.79 | 202 |
| Boiling (1 hr) | 149.7 | 0.69 | 184 |
| Water (24 hrs, rt) | 169.4 | 0.78 | 187 |

It can be seen that water washing alone does not significantly effect the S, Fe, Mg or Ca content of the aluminas, although the Na level is reduced.

EXAMPLE 9

Silica Washing

A sodium aluminate-derived precipitated silica (ES70X from INEOS) was subjected to base+acid washing using 2M NH$_4$OH and 2M HNO$_3$ according to the method of Example 3, except that the base washing was continued only for 1 hr rather than 24 hrs. The results are as follows;

TABLE 9a

| Wash | Contaminant levels (ppm) | | | | | | | | |
|---|---|---|---|---|---|---|---|---|---|
| | S | Fe | Ca | Na | Al | Ti | Zn | Mg | Zr |
| none | 124 | 96 | 717 | 322 | 172 | 173 | 3 | 46 | 17 |
| B + A | <10 | 37 | 291 | 105 | 135 | 156 | 3 | 22 | 22 |

It can be seen that the base+acid washing has markedly reduced the S, Fe, Ca, Na and Mg levels.

The invention claimed is:

1. A process for preparing a Fischer-Tropsch catalyst, comprising:
   (A) preparing a catalyst support by:
      i) washing a dried and/or calcined precipitated metal oxide material with water and an aqueous solution of nitric acid and aqueous ammonia, wherein the level of sulphur contaminant content of the washed material is reduced by >50% compared to the unwashed material and wherein the level of a Group 1A metal and a Group 2A metal contaminant content of the washed material is reduced at least 25% compared to the unwashed material; and
      ii) drying and optionally calcining the washed metal oxide material; and
   (B) contacting the catalyst support with a cobalt catalyst compound.

2. The process of claim 1, wherein the metal oxide material is an alumina, silica, titania or zirconia.

3. The process of claim 1, wherein the metal oxide material is a transition alumina.

4. The process of claim 3, wherein the transition alumina comprises a gamma alumina, a delta alumina, a theta alumina, or an alpha alumina.

5. The process of claim 1, wherein the water washes are performed after each acid and/or base washing step.

6. The process of claim 1, wherein the washed metal oxide material is calcined at >200° C. for up to 24 hours.

7. The process of claim 1, wherein the catalyst is a promoted cobalt Fischer-Tropsch catalyst.

8. The process of claim 1, wherein the catalyst support is contacted with the cobalt compound by a deposition-precipitation technique using a solution of cobalt ammine carbonate.

9. The process of claim 1, wherein the dried and/or calcined precipitated metal oxide material is a powder.

10. A process for preparing a Fischer-Tropsch catalyst, comprising:
(A) preparing a catalyst support by:
  i) washing a dried and/or calcined precipitated transition alumina material with water and an aqueous solution of nitric acid and aqueous ammonia, thereby reducing the sulphur content of the washed material below 150 ppm and reducing Group 1A metal and 2A metal content of the washed material below 80 ppm; and
  ii) drying and optionally calcining the washed metal oxide material; and
(B) contacting the catalyst support with a cobalt compound.

11. The process of claim 10, wherein the dried and/or calcined transition alumina material is a powder.

12. A process for preparing a Fischer-Tropsch catalyst, comprising:
(A) preparing a catalyst support by:
  i) washing a dried and/or calcined precipitated metal oxide material with water and an aqueous solution of nitric acid and aqueous ammonia to:
    (a) reduce the level of sulphur contaminant in the precipitated metal oxide; and
    (b) reduce the contaminant level of at least one of chlorine, a Group 1A metal, a Group 2A metal, or a transition metal contaminant in the precipitated metal oxide;
  ii) drying and optionally calcining the washed metal oxide material;
(B) contacting the catalyst support with a cobalt compound by impregnation or precipitation to form an impregnated or precipitated mixture;
(C) drying and/or calcining the impregnated or precipitated mixture; and
(D) forming the dried and/or calcined mixture into shaped units by extrusion, tabletting, or granulation.

13. The process of claim 12, wherein the dried and/or calcined precipitated metal oxide material is a powder.

* * * * *